June 23, 1964  W. H. COULTER ET AL  3,138,294
AUTOMATIC DILUTING APPARATUS
Filed Nov. 17, 1960
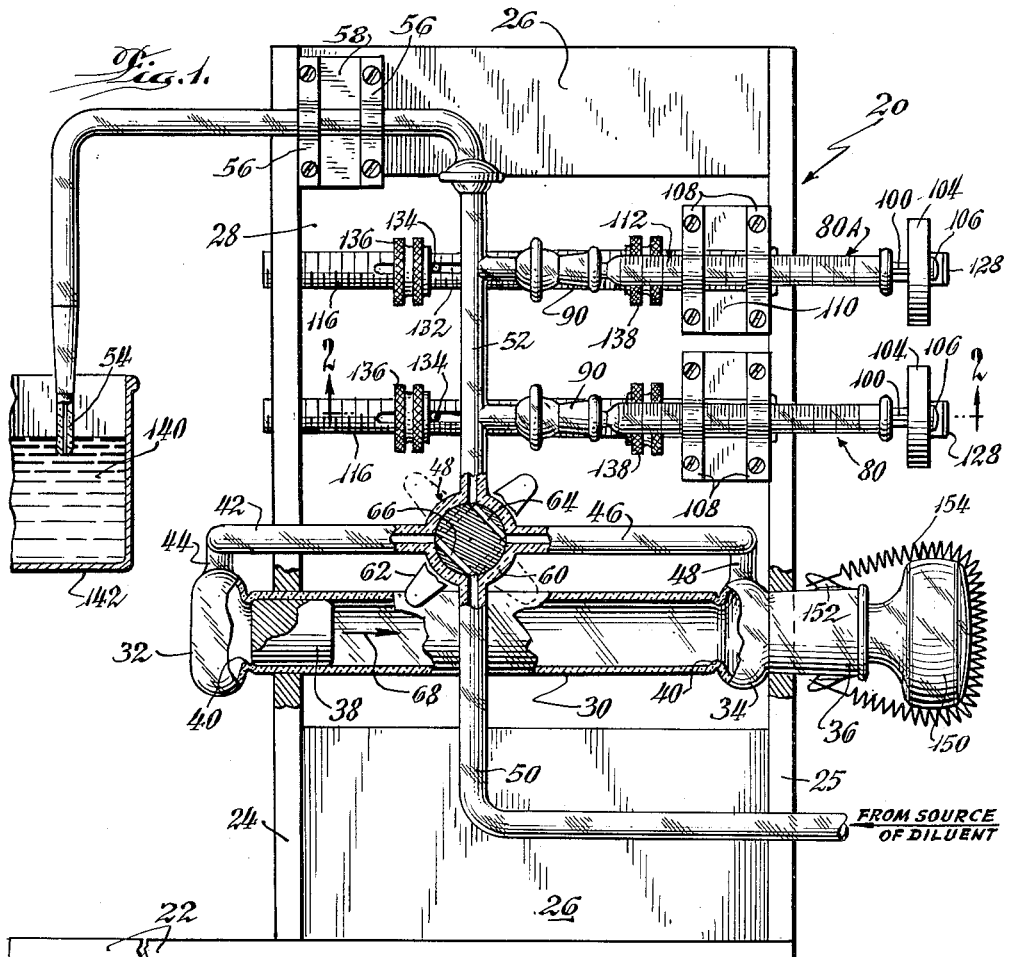
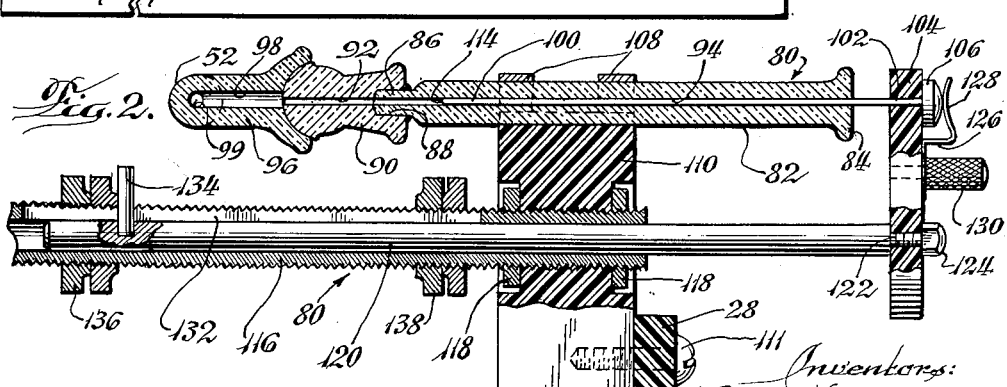

United States Patent Office 3,138,294
Patented June 23, 1964

3,138,294
AUTOMATIC DILUTING APPARATUS
Wallace Henry Coulter, Chicago, Ill.; Joseph Richard Coulter, Jr., 413 Ash Road, Roselle, Ill.; and William Anthony Claps, 1134 S. Mayfield, Chicago, Ill.; said Wallace Henry Coulter assignor to Coulter Electronics, Inc., Hialeah, Fla., a corporation of Illinois
Filed Nov. 17, 1960, Ser. No. 69,890
14 Claims. (Cl. 222—132)

This invention relates generally to apparatus for preparing diluted solutions, and more particularly, is concerned with improvements in apparatus of the character described which enables automatic and positive control of the respective quantities of the substances to be used in preparing a solution of any desired concentration within a wide range of concentrations over which the apparatus is capable of operating.

Although the apparatus embodying the invention will be described and illustrated herein with respect to preparation of diluted solutions of desired concentration, it should be understood that the apparatus also may be useful in preparing colloidal suspensions or mixtures of fluids and the like in predetermined concentrations. The fundamental principles of operation of said apparatus may be utilized, with suitable modifications in structure, if necessary but without departure from the invention, to prepare diluted concentrations of a fluid body not necessarily coming within the chemical definition of a "solution." Also, in disclosing a preferred embodiment of the invention, the term "diluent" will be used to refer to the liquid diluting agent and the term "concentrate" will be used to refer to the substance which is diluted with the diluent. Primarily, these terms are used for convenience to differentiate between the substances which make up the diluted solution prepared with the apparatus of the invention and are not used to distinguish fundamentally between the substances or character of the diluted solution.

One of the important uses of which the apparatus embodying the invention is capable is for dilution of a blood sample with a saline solution for blood count determinations. Other uses to which the apparatus can be put are the preparation of a sample solution for analysis, measurement and testing in the fields of food chemistry, metallurgy, biological sciences, petroleum chemistry and numerous others which will occur to the skilled artisan. After a sample solution of predetermined concentration has been prepared, it can be analyzed and tested, for instance, by means of a particle analyzing device such as disclosed and claimed in U.S. Letters Patent No. 2,656,508 granted October 20, 1953 to Wallace H. Coulter to ascertain various physical and chemical properties thereof. Other analytical or testing devices also are well known, but generally, it is a common requirement thereof that the fluid sample to be tested be of a known concentration. Consequently, the speed with which determinations can be made by such fluid analyzing and testing devices and the degree of accuracy of such determinations is in some measure dependent upon the speed and accuracy with which the fluid sample to be tested can be prepared and the range of solution concentrations within which the apparatus employed is operative efficiently and effectively.

Usually, it is desirable to dilute a sample concentrate to a standard concentration which lends itself conveniently to other mathematical computations which may be required. Also, the sample solutions may be finely diluted and desirably are relatively small volumes of fluid so that even small deviations from the quantity of the concentrate and diluent necessary to prepare a solution of predetermined concentration will be reflected in substantial percentages of error in concentration. The qualities of satisfactory speed, simplicity and accuracy of operation for apparatus for diluting solutions heretofore has not been achieved in a single device to the best of our knowledge notwithstanding the large number of titrating and metering devices heretofore known and used.

It is a major object of the invention to provide apparatus of the character described which is constructed to permit all of the advantages hereinabove mentioned to be realized, as well as others.

An important object of the invention is to provide apparatus of the character described which is substantially automatic in controlling the quantity of the concentrate and diluent used to prepare a solution of a predetermined concentration.

Another important object of the invention is to provide automatic diluting apparatus of the character described which enables solutions of different concentrations to be prepared substantially continuously, i.e., without shutdown of the apparatus after preparation of a solution of a first concentration in order to prepare a solution of a second concentration or even a second solution of said first concentration, and without delay occasioned by undue preparation of the apparatus for subsequent operation thereof.

Another object of the invention is to provide apparatus as described which includes a vessel having a predetermined volume, said vessel being closed at both ends thereof and having a piston plug close-fitted and freely slidable in the interior of the vessel in opposite directions, a pluralway valve having individual connections to both ends of the vessel, a fluid dispensing connection and a connection to a source of the diluent under pressure, said apparatus having novel means for selectively varying the volumetric capacity of the apparatus and thereafter introducing into the apparatus a quantity of concentrate corresponding to said variation on volumetric capacity of the apparatus to obtain a desired sample solution of predetermined concentration the volume of which is equal to the known volume of the vessel.

Another object of the invention is to provide apparatus of the character described which can be operative in an alternate capacity as an adjustable volume apparatus for metering relatively small quantities of fluids having a desired concentration.

Another object of the invention is to provide apparatus of the character described which is operative without loss of efficiency, accuracy and speed over a wide range of different concentrations of sample solutions capable of being prepared with said apparatus.

The foregoing and other objects of the invention will become apparent as the description thereof evolves in connection with which, a preferred embodiment of the invention has been described in detail and illustrated in the accompanying drawing. It is contemplated that minor variations in the size, arrangement, proportion and construction of the parts thereof may occur to the skilled artisan without departing from the scope or sacrificing any of the advantages of the invention.

In the drawings:

FIG. 1 is a side elevational view of the apparatus embodying the invention in position for preparing a sample solution, the concentrate to be used being shown in the partial illustration of a beaker in the left-hand portion of the figure, and portions being sectioned to show details of structure.

FIG. 2 is a fragmentary sectional view taken through the said apparatus along the line 2—2 of FIG. 1 and in direction indicated generally.

Referring now to FIG. 1, the apparatus embodying the invention is designated generally by the reference character 20. The operating components of the apparatus conveniently are supported on a rack having a horizontally arranged base 22, a pair of parallel spaced apart standards 24 and 25 upright on the base and braced by the cross-members 26, top and bottom, and a panel 28 connected between the standards 24. Considering FIG. 1 as a front elevational view of the apparatus 20, the panel 28 would form the rear wall of the rack. It should be appreciated that the precise construction of the rack and the material from which it is made may vary within wide limits and hence, are not considered to be critical.

The apparatus 20 has a horizontally arranged vessel 30 of predetermined volume supported between the said standards. Preferably, the vessel 30 may be a ground-out glass cylinder or of precision-formed glass tubing which has been blown to the desired shape. The vessel is closed at both ends thereof, said ends being enlarged respectively as shown at 32 and 34. The enlarged end 34 has an axial extension 36 thereof which is extended through a suitable passageway in standard 24. The opposite enlarged end 32 is disposed exterior of the opposite standard 24 with the vessel 30 extending through said standard. On the interior of the cylindrical vessel 30 is a double acting piston plug 38 of any suitable material such as glass, plastic or the like suitably dimensioned to be freely slidable on the interior of the vessel yet close-fitted therein therein so as to be separated from the interior wall of the vessel by perhaps a very thin film of the diluent fluid which will function also as a lubricant to facilitate sliding movement of the piston 38. Movement of piston 38 in either direction is limited by the stop means 40 which conveniently may comprise an inwardly protruding annular ridge or bead formed at the juncture of the vessel with the enlarged end formations 32 and 34 thereof respectively. It will be apparent that the volume of fluid swept out of the vessel 30 by the piston plug in its sliding movement between the stop means 40 will be equal to the volume of the vessel 30 between said stop means less the volume displaced by said plug 38. This comprises the predetermined or calibrated volume of said vessel and the volume of fluid which will be dispensed by the apparatus during a single traversal of said plug 38 from end to end of the vessel.

A conduit preferably in the form of a glass tube 42 is heat-sealed at one end 44 thereof to the enlarged formation 32 in communication with one end of the cylindrical vessel 30. A second glass tube 46 likewise is sealed at one end 48 thereof to the enlarged formation 34 in communication with the opposite end of the vessel 30. Preferably each of said glass tubes 42 and 46 is secured to the top of the respective enlarged end formation of the cylindrical vessel to limit formation of air bubbles. The opposite end of each of said tubes 42 and 46 is connected to a plural-way control valve designated generally 48 with said opposite ends being spaced apart on the circumference of the valve approximately 180°. The control valve 48 has one end of a glass tube 50 connected thereto with the opposite end of said tube 50 adapted to be connected to a source of diluent under pressure (not shown) to be dispensed by the vessel 30. A dispensing tube 52 provided with a discharge nozzle or outlet 54 also is sealed to the valve. The dispensing tube 52 is conveniently shaped and retained in desired position on the rack by means of the clamp straps 56 mounted by suitable fasteners to the block 58 carried on the cross-member 26.

The control valve 48 includes a cylindrical barrel 60 along the circumference of which are heat-sealed the conduits or tubes 42, 46, 50 and 52 respectively at points circumferentially spaced apart approximately 90°. The tap 62 of the control valve has a pair of passageways 64 and 66 therethrough for selectively connecting either of the ends of cylindrical vessel 30 to the dispensing tube 52 or the delivery tube 50.

As seen in FIG. 1, the illustrated solid-line position of the tap 62 places the conduit 46 in communication with the dispensing tube 52 through the passageway 64 and the conduit 42 in communication with the delivery conduit 50 through the passageway 66. Upon rotating the tap through 90° to the position shown in broken outline, the connection is reversed, that is to say, the ends of the cylindrical vessel 30 which are connected with the source of diluent and the discharge outlet 54 respectively are reversed from the condition thereof illustrated in solid outline in FIG. 1. It will be appreciated that the tap may be rotated 90° either clockwise or counterclockwise to effect such reversal of connections. Considering the condition of the apparatus as illustrated in FIG. 1 wherein the plug 38 is at the left hand end of the vessel 30 diluent under pressure entering the tube 50 will be led through the tube 42 into the enlarged end formation 32 to impinge against the plug 38 and force said plug to move to the right in the direction of arrow 68. In travelling toward the opposite end of the vessel 30, the plug 38 will sweep out of the vessel 30 an amount of fluid corresponding to the known volume of the vessel 30. This fluid will be forced through the tube 46 and passageway 64 into dispensing tube 52 and thence force an identical volume of fluid out through dispensing nozzle or outlet 54. Concurrently, diluent fluid will fill the vessel 30 to the left of plug 38. Then, upon rotating the tap 62 clockwise, for instance, through 90° to the broken outline position thereof illustrated in FIG. 1, the condition of the apparatus 20 will obtain where fluid entering tube 50 will be let through passageway 64 into tube 46 and enlarged end 34 to impinge against plug 38 seated against the stop means 40 at the right hand end of the vessel 30 and drive said plug 38 in the opposite direction or to the left. Fluid in the vessel again will be swept out by the moving plug through conduit 42 into passage-way 66 communicating with the dispensing tube 52 and thence outward through dispensing outlet 54. Concurrently, the vessel 30 will be filled to the right of said plug. Of course, it is presumed, that the system represented by the various tubes 42, 46, 50, 52 and vessel 30 is entirely filled with fluid at all times so that the fluid swept out of the vessel 30 during travel of the plug from one end to the other of said vessel displaces an identical volume of fluid between the dispensing outlet 54 and control valve 48. The connection of the delivery tube 50 to the source of diluent under pressure is uninterrupted at all times.

With such a controlled known volume of fluid which will be dispensed as a result of traversal of the vessel 30 from end to end thereof by plug 38, we now provide novel syringe-like means for selectively introducing a controlled volumetric variable into the apparatus which enables the apparatus 20 to achieve the functions of an automatic diluting apparatus. In other words, said means permits introduction into the system of a predetermined volume of concentrate which automatically is admixed with the known volume of fluid dispensed by the vessel 30 to obtain a predetermined concentration of said calibrated volume of fluid which thereafter will be dispensed by the apparatus. Said means is illustrated in FIGS. 1 and 2 and is designated generally by the reference character 80. Although a pair of such means 80 and 80A is illustrated in FIG. 1, each is substantially identical in construction and is operable independently of its mate. However, one of said means 80 may be calibrated to introduce into the system a volumetric variable which is different from that which its companion is calibrated to introduce, if so desired. Also, the number of such means utilized in the apparatus may vary from the number illustrated including the use of more than two of such means. Only one of said syringe means will be described in detail, said description to apply as well to other of said means illustrated. However, it will be pointed out where different structural features can be incorporated into the other of said means for varying the concentration of the fluid sample dispensed by the apparatus.

Said means 80 includes a vessel provided by a length of capillary glass tubing 82 having a flared, flattened end 84 and a reduced dimension opposite end 86 which is rigidly secured, as by a suitable cement for instance, in a socket 88 formed in one end of the glass nipple 90.

The bore 92 of the nipple 90 communicates with the central passageway 94. Nipple 90 is retained by the gland 96 on the dispensing tube 52 located between control valve 48 and the discharge outlet 54. The passageway 98 of the gland is in communication with the central bore 92 and the dispensing tube 52 as indicated at 99. An elongate solid plunger or stem 100 is telescopically and slidably engaged in the capillary passageway 94 in a close-fit and is sufficiently long so that an end portion 102 thereof protrudes outwardly of the flared end 84 and is slidably extended through a coupling plate 104. A cap nut 106 is secured to the extremity of said portion 102 exterior of the coupling plate. The capillary tube 82 is retained in horizontal disposition on the rack by means of the clamping straps 108 secured to support block 110 which is mounted to the panel 28 by suitable fasteners, such as 111.

A volumetric scale 112 is etched or otherwise formed on the tubing 82 the calibrations of which delineate the volume of the passageway 94 between designated points therealong. The extremity 114 of said plunger 100 on the interior of the passageway 94 can be brought into registry with the zero calibration of the scale 112 which is located adjacent the left-hand end of the tube 82 with the plunger 100 traversing the entire scale and occupying all of the passageway 94 to the right of said extremity 114 as viewed in the drawing. By withdrawing the plunger 100 from the passageway 94, i.e., moving the plunger to the right, a portion of the passageway 94 is evacuated or unoccupied related to the linear distance said plunger is withdrawn. The volume of that now unoccupied portion of the passageway 94 can be determined directly from a reading of the calibration on said scale 112 with which the extremity 114 is in registry.

We further provide means enabling said plunger to be withdrawn axially from the passageway 94 only a predetermined identical distance each time and adjustment means for selectively varying said predetermined identical distance which it can be withdrawn. An elongate, externally threaded sleeve 116 has one end thereof inserted through a suitable passageway in the support block 110 and secured to the block 110 by nuts 118 screwed on said sleeve into frictional engagement with opposite faces of the block. The opposite faces of the block 110 may be countersunk in the usual manner for accommodating the locking nuts 118 below said faces. As seen in FIG. 1, sleeve 116 may be sufficiently long to permit same to be passed through a suitable opening in standard 24 for supporting said sleeve in horizontal position substantially parallel to the capillary tubing 82. Slidably engaged within said sleeve 46 is an elongate rod 120 having an externally threaded reduced dimension extremity 122 which is extended through the coupling plate 104 and rigidly secured to said plate by the cap nut 124. As seen in FIG. 2, the rod 120 and plunger 100 have their axes parallel and are coupled for movement in unison by means of the coupling plate 104. A spring clip 126 is secured on the outer face of said coupling plate 104 with said clip having a resilient finger 128 bearing against the cap nut 106. A knurled knob 130 conveniently is secured to the plate 104 for manually moving the rod 120 and plunger 100 simultaneously in either one of opposite directions.

The sleeve 116 has a longitudinally extending slot 132 in the circumferential wall thereof through which the rod 120 is exposed. Pin 134 is secured in a suitable socket in rod 120 transverse to the length of the rod and is sufficiently long to protrude outwardly through the slot 132. Threaded on the sleeve 116 are two pairs 136 and 138 of nuts which may be selectively locked at spaced apart locations along the length of the sleeve with the pin 134 disposed between said pairs. As seen in FIG. 2, the rod 120 and hence the plunger 100 can be moved a linear distance limited to the linear distance between the spaced apart pairs of nuts 136 and 138 by reason of the pin 134. The pair of nuts 136 conveniently may be positioned on the sleeve 116 to correspond with registry of extremity 114 with the zero calibration or scale 112. The pair of nuts 138 can be positioned spaced from the pair of nuts 136 a predetermined distance corresponding to the volumetric reading on scale 112 desired, that is, the volume of the passageway 94 desired to be evacuated when the plunger 100 is moved in unison with the rod 120. It will be appreciated that the length of the rod 120 will be selected so as to permit all readings on the scale 112 to be realized.

Considering now the operation of apparatus 20, for purposes of description, it will be presumed that it is desired to prepare a predetermined diluted blood solution for a blood count determination. For a red cell determination, we will use a sample saline solution having a concentration of 1 part blood to 500 parts of solution. A white cell determination would require a more diluted concentrate. The known volume of the vessel 30 will be selected at 20 milliliters. The volumetric capacity of the capillary tubing of means 80 is of the order of 250 microliters and that of means 80A is of the order of 50 microliters. Of course, the scales 112 of each of said means 80 and 80A respectively will be suitably calibrated.

The plunger 100 is initially set at a position corresponding to the zero setting of scale 112 as illustrated in FIG. 2. The apparatus initially is filled completely with diluent by rotating the control valve 48 since the tube 50 always remains connected to the source of diluent saline solution under pressure. As intended to be shown in the drawing, the apparatus already has been filled preparatory to making the desired diluted blood solution with the exception that tap 62 will be considered initially to be in a position displaced 90° from the solid outline position thereof illustrated in FIG. 1. The end of the discharge nozzle is wiped to remove suspended diluent thereat. The pairs of nuts 136 and 138 are located spaced along the sleeve 116 so as to limit the movement of the plunger 100 between the zero calibration and 40 microliter of scale 112.

The discharge nozzle or outlet 54 is immersed in a blood concentrate 140 which may be in a beaker 142 shown partially in FIG. 1. The operator then withdraws the plunger 100 by pulling outwardly on knob 130 until the pin 134 engages the pair of nuts 138. At this time the extremity 114 of the plunger 100 will have been moved from the zero calibration to the 40 microliter calibration of scale 112 automatically evacuating a volume of 40 microliters. The pressure head between the nozzle or outlet 54 and the now evacuated 40 microliter volume of passageway 94 will cause 40 microliters of diluent in conduit 52 to flow into the evacuated portions of the passageway 94 and correspondingly 40 microliters of blood 140 to be drawn into the outlet 54. Beaker 142 is now withdrawn and the tap 62 rotated to the position thereof shown in FIG. 1. Diluent entering tube 50 under pressure will be led through passageway 66 into tube 42, and then, into the enlarged end formation 32 to impinge against the left hand face of the plug 38. The plug 38 will be moved to the right in the direction of arrow 68 toward the opposite end of the vessel 30. When the plug has traversed the vessel 30 to engage against the opposite stop means 40, 20 mls. of diluent will have been swept out of the vessel and forced through conduit 46 and passageway 64 into the dispensing tube 52 and automatically displaced 20 mls. of diluent which will be discharged out of the discharge outlet 54. This discharged known quantity of fluid can be captured in a clean vessel and it will contain 40 microliters of the blood concentrate 140 which previously had been drawn into the tube 52 through the nozzle 54. During movement of plug 38 to the right, fresh diluent automatically will fill the vessel 30 to the left of the plug 38. Thus, the apparatus always is ready for operation since the vessel 30 automatically is charged with diluent and the conduit 50 need never be disconnected from the source of diluent under pressure or any valve operated to load the vessel 30. The 20 mls. of solution which has been discharged through outlet 54 automatically is a known volume of a blood in saline solution having 1 part blood to 500 parts of solution.

To repeat the operation of the apparatus, the plunger 100 will be returned to a position corresponding to the zero reading on scale 112 thereby pushing out of the tubing 82 the corresponding volume of fluid previously in passageway 94. Discharge outlet 54 again is immersed in the concentrate 140 and the plunger moved to the right so as to draw a corresponding 40 microliters of concentrate 140 into the discharge outlet 54. Beaker 142 is withdrawn and the tap 62 rotated so that tube 50 is connected to tube 46 and tube 42 is connected to the dispensing tube 52. This will cause the plug 38 to be forced toward the left hand end of the vessel 30 sweeping out diluent from the vessel into tube 42, through passageway 66 into dispensing tube 52, so as to discharge a corresponding volume of fluid through outlet 54. The 20 mls. of diluent discharge a corresponding volume of fluid through outlet 54. The 20 mls. of discharged diluent automatically will contain 1 part blood to 500 parts solution.

It is possible for the operator to dispense the diluted concentrate and simultaneously cock the apparatus for another run directly after dispensing of the diluted concentrate. For instance, the operator may turn the tap 62 and at the same time push the plunger 100 inwardly to expel the diluent in the tubing 82 into the dispensing conduit 52. In such an instance, the total amount of solution discharged through the nozzle 54 would be 20 mls. plus the 40 microliters of diluent expelled from the syringe 80. This will not be a precise diluted concentrate of 1 part per 500 parts of solution, but since the dilution is very fine, the percentage of deviation is negligible. On the other hand, to operate the apparatus again, the operator need only withdraw the plunger 100 the desired amount with discharge nozzle 54 in a concentrate. Thus, the apparatus would be cocked for operation immediately after the one cycle of operation has been completed.

Referring to FIG. 2, a second syringe-like means 80A may be provided which can be used concurrently with or independently of the means 80. For instance, it may be desired to achieve a diluted solution the concentration of which cannot be achieved with the means 80 alone or which more conveniently and rapidly can be achieved with use of both of the means 80 and 80A. This situation might obtain for very fine determinations required to be made. Thus, the syringe-like means 80A may be provided with a different volumetric capacity for instance, of the order of 50 microliters or with the same capacity as means 80. For purposes of clarification, it is presumed that a sample of diluted concentrate has been prepared using the means 80 having a concentration of (1) part concentrate to 500 parts of solution or a concentration of $1/N_1$ where $N_1$ is the total volume of solution. This sample has been discharged into a clean beaker and the plunger 100 left in its withdrawn condition. Now, the outlet 54 is immersed in said diluted concentrate and the plunger of the second means 80A withdrawn to draw in a quantity of the solution of concentration $1/N_1$. The control valve 48 is operated to reverse the connections of the ends of vessel 30 to discharge a calibrated volume of solution which will have been further diluted to a solution having a concentration of $$\frac{1}{N_1} \times N_2$$

where $1/N_2$ is the dilution which would have been realized where the second means 80A had been operated alone. If both means 80 and 80A have the same volume or the plunger thereof is withdrawn to suck in the same volume of fluid through outlet 54, the resulting dilution employing both of the means 80 and 80A in the manner described will be equal to $1/(N_2)^2$.

It will thus be seen that by using such syringe-like means 80 and/or 80A, it is possible to achieve very fine dilutions of fluid concentrate very accurately and rapidly. The connection of the delivery tube 50 to the source of diluent under pressure remains uninterrupted at all times. However, the device 20 also is capable of being used with the syringe means 80 and/or 80A alone for measurement and dilution purposes. Consider that it is desired to prepare a sample solution the dilution of which requires use of volumes of concentrate and diluent within the ranges of the volumes of the capillary tubes 82 of said syringe means. In such an instance, the vessel 30 is not utilized at all. First, the plunger 100 of one of said means 80 or 80A is withdrawn a predetermined distance with outlet 54 in a first solution thereby sucking in a corresponding volume of said first solution. Then the plunger of the second of said syringe means is withdrawn a predetermined distance with outlet 54 in a second solution. A corresponding volume of said second solution will be drawn into the tube 52. The syringes are then discharged together by pushing in the said plungers.

It will be appreciated that some contamination of the resulting diluted solution may be encountered which can be suitably minimized by judicious choice of the fluids metered. However, in many instances to which the apparatus may be put to use in this manner, the possible contamination will be negligible. In such cases, the apparatus 20 may be used to meter out small quantities of fluids merely by using one of the syringe means. Of course, more than two of such syringe means may be provided for the apparatus 20.

Consider now that it is desired to prepare a diluted solution of predetermined concentration and the desired solution, but of a different concentration, already is in the various tubing of the apparatus 20. Initially, one of the plungers 100 is withdrawn a predetermined distance and the control valve 48 operated to fill the system entirely to the tip of the discharge nozzle 54. The discharge nozzle 54 then is immersed in the fluid concentrate to be diluted and the plunger of the second syringe means pulled out a preselected distance. Now, either the first syringe means or both of said means can be discharged.

In the event that both of the syringe means are discharged, the dilution of the discharged solution will be $$\frac{VS_2}{VS_1 + VS_2} \tag{1}$$

where VS is the volume of the particular syringe means as a result of the distance the plunger 100 thereof is withdrawn and the numeral subscript identifies the syringe means.

From the foregoing description it will be apparent that the syringe means can be variously operated and calibrated to achieve very fine dilutions of fluids apart from use of the volume of the vessel 30. Also, the syringe means can be used with the calibrated volume of vessel 30.

Attention is invited to the right hand end of vessel 30. The extension 36 may be left open for receiving a ground-glass stopper 150 therein. The extension 36 can be formed with protruding ears or hooks 152 so that the stopper 150 can be releasably secured to the extension 36 by means of the spring 154. This construction permits the volume of the vessel 30 to be varied selectively by replacing the piston plug 38 with one of a different volumetric displacement through the open end of the extension 36. It may be necessary to eliminate the means 40 at the right end of the vessel and use the inside end of the stopper 150 as the stop means thereat.

It is believed that the invention has been described in sufficient detail so as to enable the skilled artisan to understand and practice the invention in all of its ramifications. It will be appreciated that variations in the structure of component parts of the apparatus for accomplishing the functions thereof may be possible for particular solutions sought to be prepared by the apparatus, such as in the type of materials used to form the various conduits or tubes, the control valve 48 or other parts of the apparatus but still using the basic principles of operation thereof. The invention has been distinctly pointed out in the claims hereto appended using language intended to be broadly construed commensurate with the progress in the arts and sciences contributed by said invention.

What it is desired to secure by Letters Patent of the U.S. is:

1. Automatic diluting apparatus comprising, a closed vessel having an inlet port and an outlet port and a piston freely moveable between said ports in opposite directions for sweeping out a known volume of fluid from the vessel through either one of said ports depending upon the direction of movement of the piston, a fluid control valve having individual fluid conduit connections with each of said ports, a fluid dispensing tube having a discharge outlet and a fluid delivery tube adapted to be connected to a source of diluent under pressure, said valve being selectively operable to connect either one of said conduit connections to either one of said dispensing and delivery tubes with the other of said conduit connections connected concurrently to the other of said dispensing and delivery tubes, and means for selectively introducing into the apparatus through said discharge outlet a quantity of concentrate required to prepare said known volume of a diluted solution of said diluent having a predetermined concentration of said concentrate therein, said valve operable thereafter automatically to cause discharge of said known volume of diluted solution through said discharge outlet.

2. Apparatus as described in claim 1 in which said means comprises at least one adjustable volume device operably connected with said fluid dispensing tube between said discharge outlet and said control valve.

3. Apparatus as described in claim 1 in which said means comprises a plurality of adjustable volume devices connected downstream of said control valve each capable of being operated independently one relative to the other.

4. Apparatus as described in claim 1 in which said means comprises at least one syringe device connected to said dispensing tube between said discharge outlet and said control valve.

5. Apparatus as described in claim 1 in which said means comprises at least one adjustable volume device connected with the fluid dispensing tube, said device having a vessel and a plunger movable linearly in said vessel and means operatively coupled with said plunger for limiting the linear distance through which the plunger can be retracted from the vessel.

6. Apparatus as described in claim 5 in which said last mentioned means are adjustable for selectively varying the linear distance of movement to which the plunger is limited.

7. An automatic diluting apparatus having a vessel and means for displacing a calibrated volume of a diluent from said vessel and a conduit system connected with said vessel for discharging a correspondingly calibrated volume of diluent from the apparatus when the diluent is displaced from the vessel, adjustable volume means operably connected with said conduit system for introducing into the system a predetermined quantity of concentrate calculated automatically to provide said calibrated volume of diluent subsequently discharged from the apparatus having a predetermined concentration of concentrate therein.

8. An automatic diluting apparatus having a vessel and means for displacing a predeterminable volume of diluent from said vessel and a conduit system connected with said vessel for discharging a corresponding volume of diluent from the apparatus when said diluent is displaced from the vessel, adjustable volume means operably connected with said conduit system for introducing into the system a predetermined quantity of concentrate calculated automatically to provide said same predeterminable volume of diluent subsequently discharged from the apparatus having a predetermined concentration of concentration therein, said means comprising a syringe device having a plunger for varying the volumetric capacity thereof.

9. An automatic diluting apparatus having a vessel and means for displacing a known volume of diluent from said vessel and a conduit system connected with said vessel for discharging a corresponding volume of diluent from the apparatus when the diluent is displaced from the vessel, adjustable volume means operably connected with said conduit system for introducing into the system a predetermined quantity of concentrate calculated automatically to provide said known volume of diluent subsequently discharged from the apparatus having said predetermined quantity of concentrate, said means comprising a syringe device having a plunger for varying the volumetric capacity thereof, and means coupled with said plunger for limiting the extent of movement of the plunger outwardly of the syringe.

10. Automatic diluting apparatus comprising, a closed vessel having a port at opposite ends thereof, a piston plug freely moveable between said ports in opposite directions for displacing a known volume of fluid from the vessel through either one of said ports, a fluid conduit system including a control valve, a fluid delivery tube adapted to be connected to a source of fluid under pressure and a dispensing tube, said control valve operable to connect either one of said ports to either one of said tubes while the other of said tubes is connected to the other of said ports whereby a substantially identical known volume of fluid in the system will be discharged from the dispensing tube when the fluid is so displaced from the vessel, and means for selectively varying the volumetric capacity of the fluid conduit system prior to discharge of said substantially identical volume of fluid in an amount related to a predetermined quantity of concentrate which would be required to prepare a solution of substantially the same discharged volume of fluid and concentrate having a predetermined concentration of such concentrate therein.

11. Apparatus as described in claim 10 in which said means comprises a calibrated syringe device connected with said dispensing tube.

12. Apparatus as described in claim 10 in which said means comprises at least one adjustable volume device connected with said dispensing tube, and said control valve comprises a plural-way valve having said tubes and ports in communication therewith.

13. Apparatus as described in claim 12 in which there are a plurality of said independently operable adjustable volume devices connected to said dispensing tube.

14. Apparatus as described in claim 10 in which said means comprises a volumetrically calibrated vessel having a plunger movable therein and means coupled with said plunger to restrict movement of said plunger to a predetermined distance withdrawn from the calibrated vessel.

References Cited in the file of this patent
UNITED STATES PATENTS

| | | |
|---|---|---|
| 939,382 | Beard | Nov. 9, 1909 |
| 2,677,480 | Wiczen | May 4, 1954 |
| 2,885,119 | Carriol | May 5, 1959 |
| 3,043,303 | Still | July 10, 1962 |

UNITED STATES PATENT OFFICE
CERTIFICATE OF CORRECTION

Patent No. 3,138,294                          June 23, 1964

Wallace Henry Coulter et al.

It is hereby certified that error appears in the above numbered patent requiring correction and that the said Letters Patent should read as corrected below.

Column 2, line 34, for "on" read -- in --; column 3, line 23, strike out "therein", second occurrence; column 4, line 25, for "let" read -- led --; column 7, lines 17 to 19, strike out "The 20 mls. of diluent discharge a corresponding volume of fluid through outlet 54."; column 10, line 7, for "concentrate" read -- concentration --; lines 7 and 8, for "concentration" read -- concentrate --.

Signed and sealed this 27th day of October 1964.

(SEAL)
Attest:

ERNEST W. SWIDER
Attesting Officer

EDWARD J. BRENNER
Commissioner of Patents